United States Patent [19]

Estevez-Alcolado et al.

[11] Patent Number: 5,537,472
[45] Date of Patent: Jul. 16, 1996

[54] PORTABLE TELEPHONE WITH FLIP STAND OR HINGED DOORS AND HAVING SPEAKER THEREIN

[75] Inventors: Sonia M. Estevez-Alcolado, Holmdel; David A. Fishman, Lakewood, both of N.J.

[73] Assignee: AT&T Corp., Murray Hill, N.J.

[21] Appl. No.: 401,392

[22] Filed: Mar. 9, 1995

[51] Int. Cl.[6] .................................................. H04M 1/00
[52] U.S. Cl. ........................... *379/433; 379/434; 379/454
[58] Field of Search .................................. 379/433, 434, 379/428, 446, 454, 455, 426; 455/89, 90

[56] References Cited

U.S. PATENT DOCUMENTS 5,253,292 10/1993 Fluder et al. ............................ 379/446

Primary Examiner—Jeffery Hofsass
Assistant Examiner—Jack Chiang

[57] ABSTRACT

A portable telephone includes a telephone body having a lower recess at the rear side thereof; a flip stand pivotally mounted by a pivot pin to the telephone body for pivotal movement between a first position within the lower recess and a second position out of the lower recess, the flip stand serving to support the telephone body in a slightly inclined vertical orientation on a surface in the second position; an inverted V-shaped acoustic baffle defined between the telephone body, the flip stand and the surface on which the telephone is supported when the flip stand is in the second position; and a speaker mounted to the flip stand and oriented to transmit acoustic energy into the acoustic baffle.

18 Claims, 8 Drawing Sheets

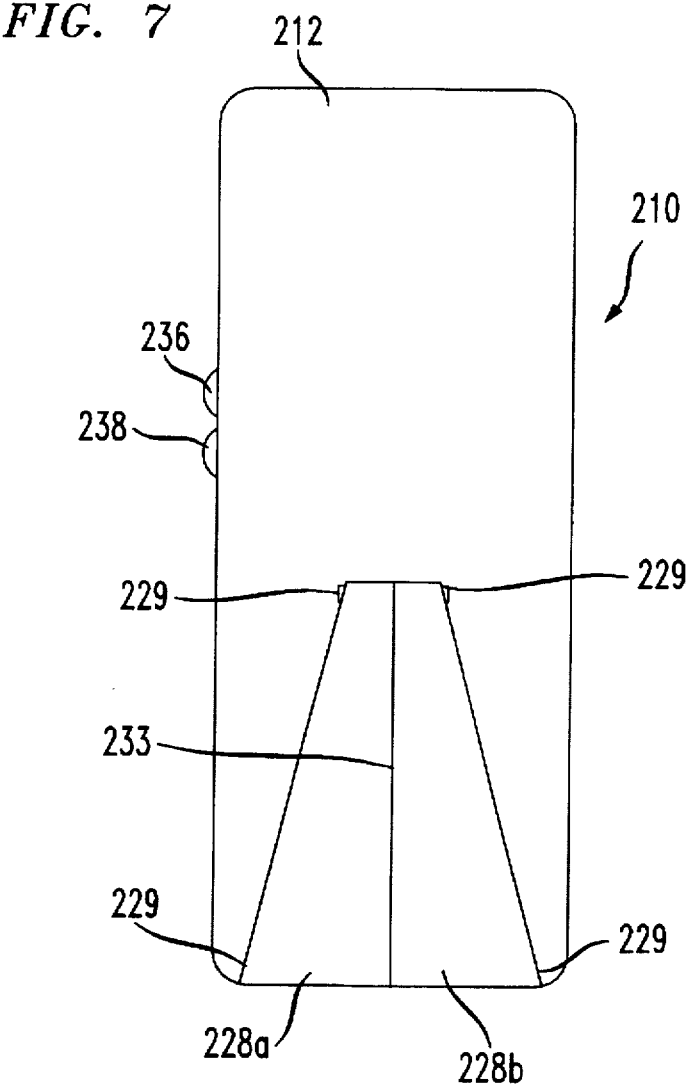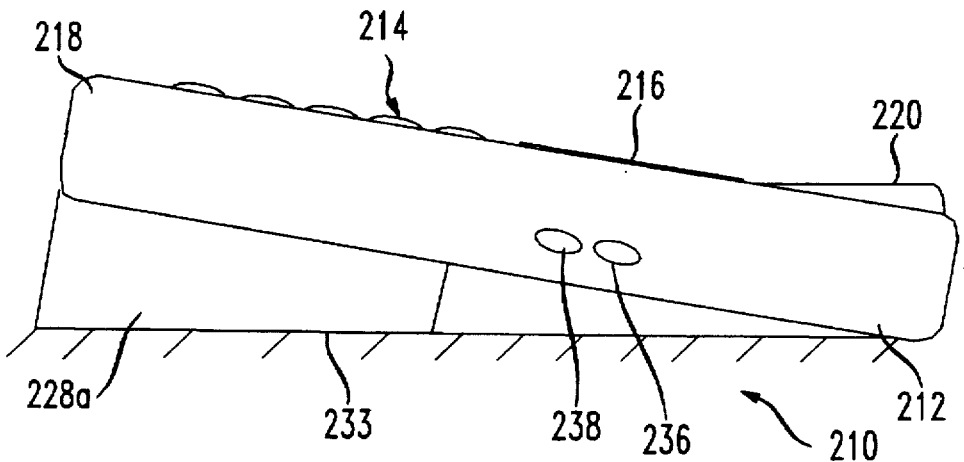

PORTABLE TELEPHONE WITH FLIP STAND OR HINGED DOORS AND HAVING SPEAKER THEREIN

BACKGROUND OF THE INVENTION

The present invention relates generally to portable telephones, and more particularly, is directed to a portable telephone with a flip stand having a speaker therein.

It is known to provide speakerphones in telephones in order to enable hands-free operation by a user. However, a portable telephone such as a micro-portable cellular phone contains space only for a small speaker. As a result, such speakerphones are not very effective when used as a personal speakerphone. Further, placement of the portable phone on a flat surface usually incurs a loss of acoustic power and loss of visibility of the LCD display of the phone.

SUMMARY OF THE INVENTION

Accordingly, it is an object of the present invention to provide a portable telephone with a flip stand having a speaker therein that overcomes the problems with the aforementioned prior art.

It is another object of the present invention to provide a portable telephone with a flip stand having a speaker therein in which an acoustic envelope is produced.

It is still another object of the present invention to provide a portable telephone with a flip stand which triggers a switch inside the phone to activate the speakerphone operation when the flip stand is in the open position.

In accordance with an aspect of the present invention, a portable telephone includes a telephone body having a lower recess at one side thereof; a flip stand mounted to the telephone body for movement between a first position within the lower recess and a second position out of the lower recess, the flip stand serving to support the telephone body in an upright orientation on a surface in the second position; an acoustic baffle defined between the telephone body, the flip stand and the surface on which the telephone is supported when the flip stand is in the second position, the acoustic baffle being open at at least one end thereof; and a speaker oriented to transmit acoustic energy into the acoustic baffle and mounted to one of the telephone body and the flip stand.

Preferably, the flip stand is pivotally mounted to the telephone body. In this regard, a pivot pin pivotally mounts an upper end of the flip stand to the telephone body. In such case, the acoustic baffle has an inverted V-shaped configuration.

The portable telephone further includes a keypad by which telephone numbers can be dialed; a liquid crystal display (LCD) for displaying information; a microphone into which a user speaks; and a receiver by which the user can listen when the receiver is placed adjacent an ear of the user.

In accordance with another aspect of the present invention, a portable telephone includes a telephone body having a lower recess at one side thereof; a flip stand mounted to the telephone body for movement between a first position within the lower recess and a second position out of the lower recess, the flip stand serving to support the telephone body in an upright orientation on a surface in the second position; an acoustic baffle defined between the telephone body, the flip stand and the supporting surface when the flip stand is in the second position, the acoustic baffle being open at at least one end thereof; and a speaker mounted to the flip stand and oriented to transmit acoustic energy into the acoustic baffle.

In accordance with still another aspect of the present invention, a portable telephone includes a telephone body having a lower recess at one side thereof; a flip stand mounted to the telephone body for movement between a first position within the lower recess and a second position out of the lower recess, the flip stand serving to support the telephone body in an upright orientation on a surface in the second position; an acoustic baffle defined between the telephone body, the flip stand and the supporting surface when the flip stand is in the second position, the acoustic baffle being open at at least one end thereof; and a speaker mounted to the telephone body and oriented to transmit acoustic energy into the acoustic baffle.

In accordance with yet another aspect of the present invention, a portable telephone includes a telephone body having a lower recess at one side thereof; two doors mounted to the telephone body for movement between a first position in covering relation to the lower recess and a second position exposing the lower recess, the doors serving to support the telephone body in a horizontal orientation on a surface in the second position; an acoustic baffle defined between the telephone body, the doors and the surface on which the telephone is supported when the doors are in the second position, the acoustic baffle being open at at least one end thereof; and a speaker oriented to transmit acoustic energy into the acoustic baffle and mounted to the telephone body.

Preferably, the doors are hingedly mounted to the telephone body.

The above and other objects, features and advantages of the invention will become readily apparent from the following detailed description thereof which is to be read in connection with the accompanying drawings.

BRIEF DESCRIPTION OF THE DRAWING

FIG. 7 is a rear plan view of a portable telephone with a flip stand having a speaker therein according to still another embodiment of the present invention, in its closed configuration;

FIG. 8 is a side elevational view of the portable telephone of FIG. 7, in its open configuration;

DESCRIPTION OF THE PREFERRED EMBODIMENTS

Figure 1:
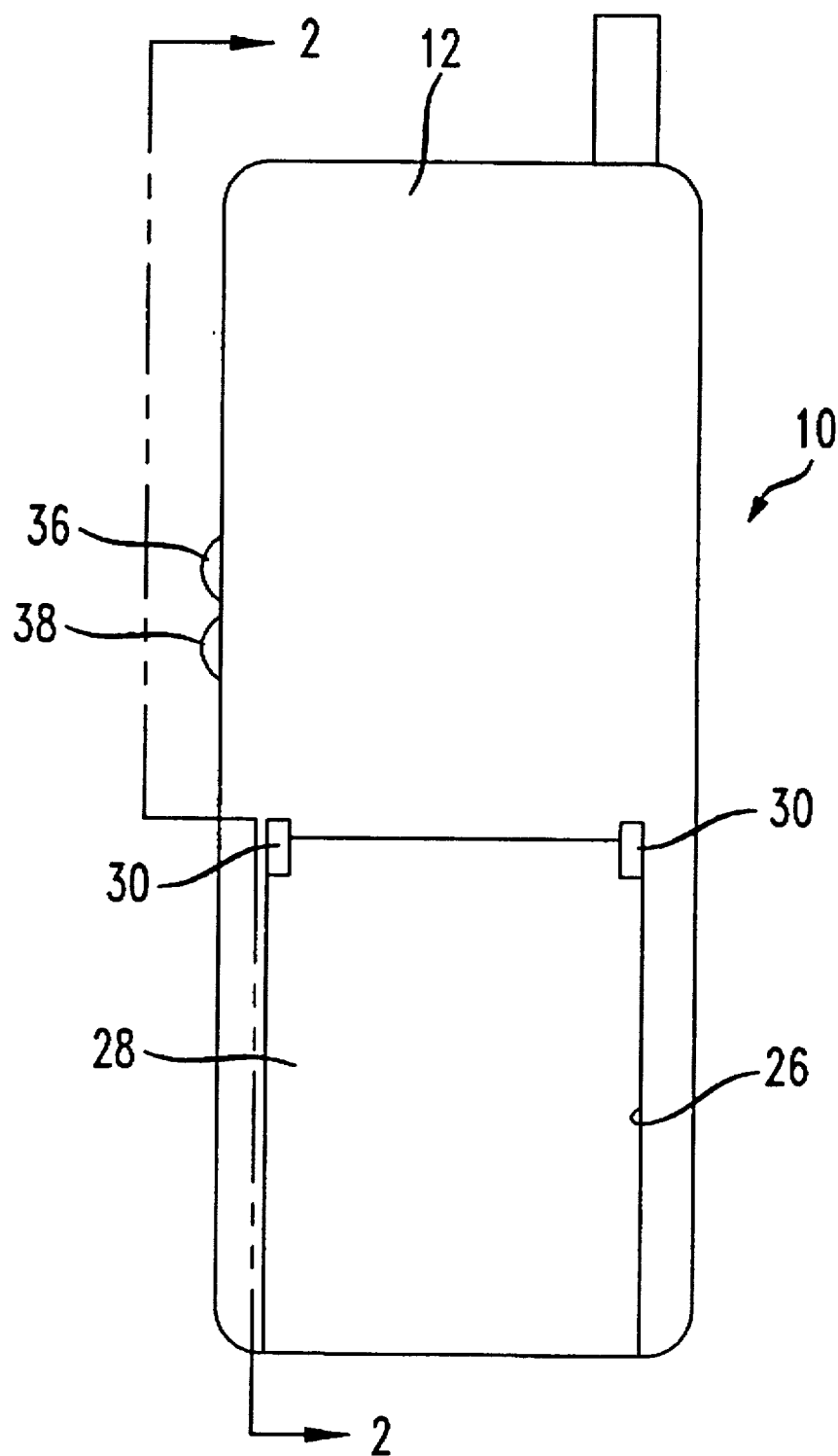
FIG. 1 is a rear elevational view of a portable telephone with a flip stand having a speaker therein according to the present invention.

Referring to the drawings in detail, a portable telephone 10 according to the present invention includes a main telephone body 12 of a generally rectangular configuration. Telephone 10 includes conventional telephone items, such as a keypad 14 by which telephone numbers can be dialed, a liquid crystal display (LCD) 16 for displaying information such as the number dialed and the like, a microphone 18 at the lower end of telephone body 12 and into which the user speaks, and a receiver 20 at the upper end of telephone body 12 by which the user can listen when receiver 20 is placed adjacent the ear of the user. All of the above elements 14–20 are accessible or viewable from the front face of telephone body 12. A printed wiring board (PWB) 22 is mounted within telephone body 12 and is electrically connected to keypad 14, LCD 16, microphone 18 and receiver 20 by wiring (not shown), for controlling the operations of keypad 14, LCD 16, microphone 18 and receiver 20, as is conventional. Further, an extensible antenna 24 extends from the upper surface of telephone body 12 and is connected for transmitting a signal to receiver 20, as is conventional.

A battery pack 25 is also mounted with the upper portion of telephone body 12 for supplying power to the various electrical components.

Figure 3:
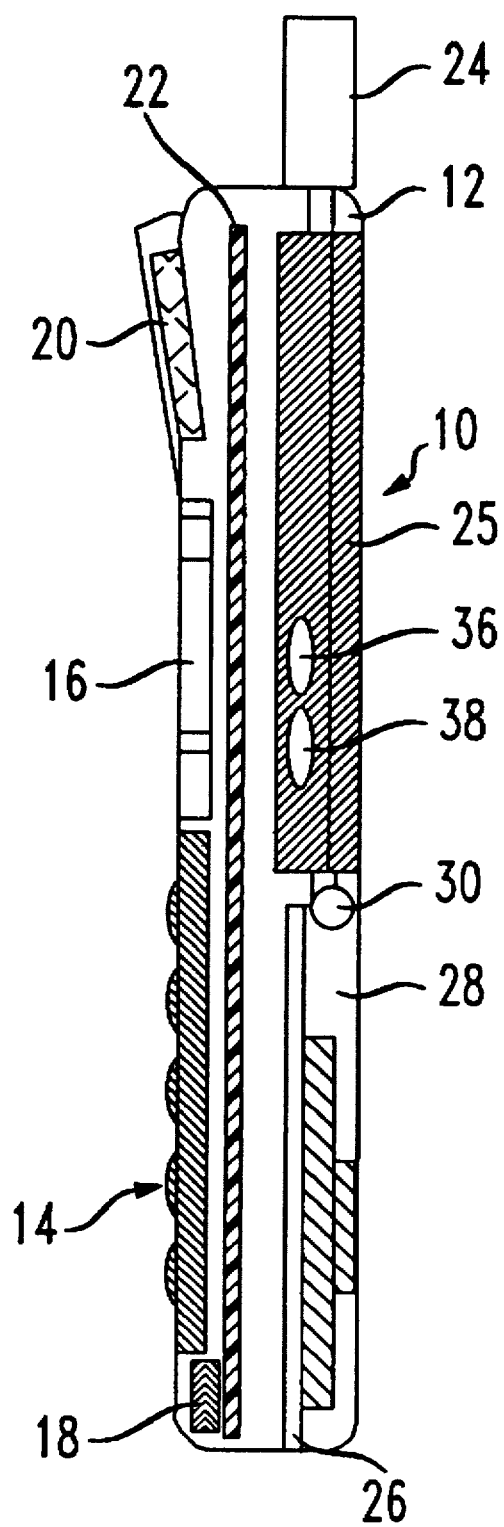
FIG. 3 is a longitudinal cross-sectional view of the portable telephone of FIG. 1, shown with the flip stand pivoted inwardly into the telephone body.

In accordance with the present invention, the lower rear portion of telephone body 12 is provided with a rectangular recess 26, and a flip stand 28 is pivotally mounted to telephone body 12 by means of a pivot pin 30 at the upper end of flip stand 28, so as to pivot flip stand 28 between a closed position within recess 26 and an open supporting position out of recess 26. Flip stand 28 has a generally rectangular configuration with dimensions slightly smaller than those of recess 26 so that when flip stand 28 is fit within recess 26, as shown in FIGS. 1 and 3, a smooth, uniform appearance is imparted to telephone 10.

Figure 2:
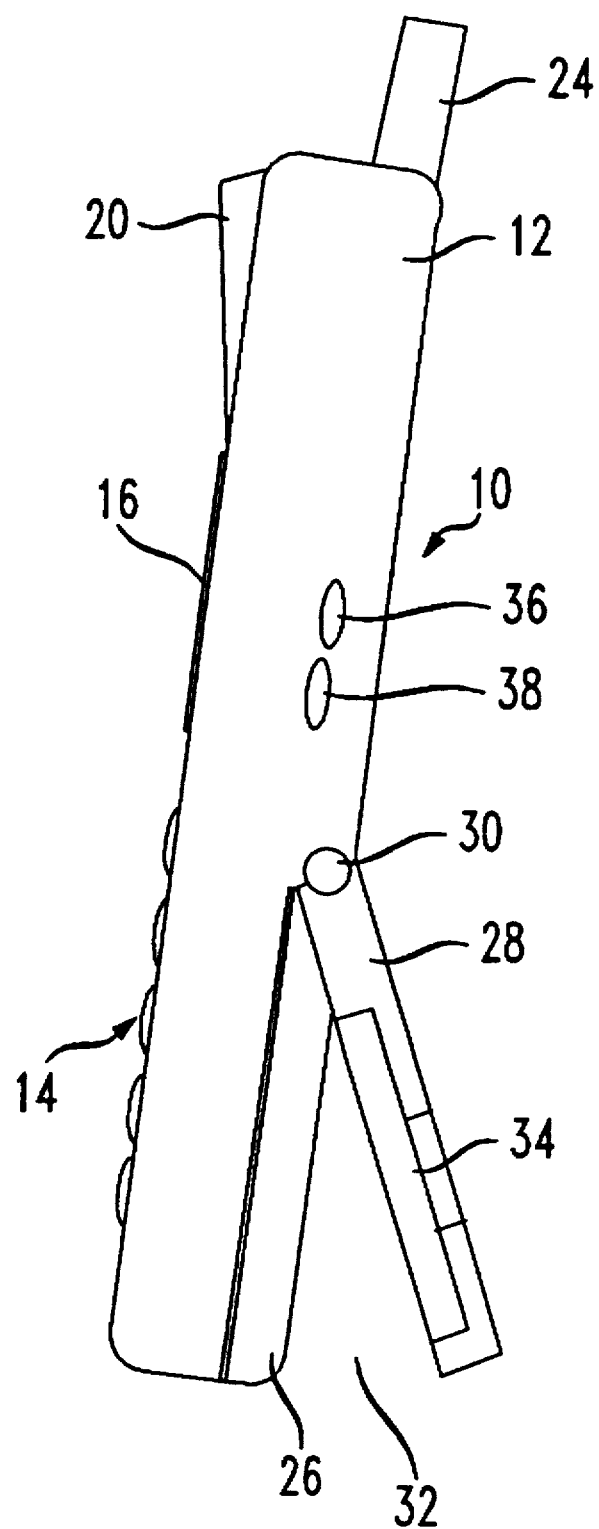
FIG. 2 is a side elevational view of the portable telephone of FIG. 1, viewed along line 2—2 thereof and shown with the flip stand pivoted outwardly away from the telephone body.

When flip stand 28 is pivoted outwardly, as shown in FIG. 2, it serves to support telephone body 12 in an upright, slightly inclined, vertical state. In this state, an inverted V-shaped acoustic cavity or baffle 32 is defined between the lower rear portion of telephone body 12, that is, at recess 26, flip stand 28 and the hard surface on which the telephone is standing, with acoustic baffle 32 being open at opposite ends thereof.

Thus, in accordance with a first embodiment of the present invention, a speakerphone defined by a loudspeaker 34 is provided in flip stand 28 and is oriented so as to transmit acoustic energy into acoustic baffle 32.

Further, with the present invention, the volume of transmitted sound from loudspeaker 34 can be adjusted by an UP volume button 36 or a DOWN volume button 38 at the side of telephone body 12.

Figure 4:
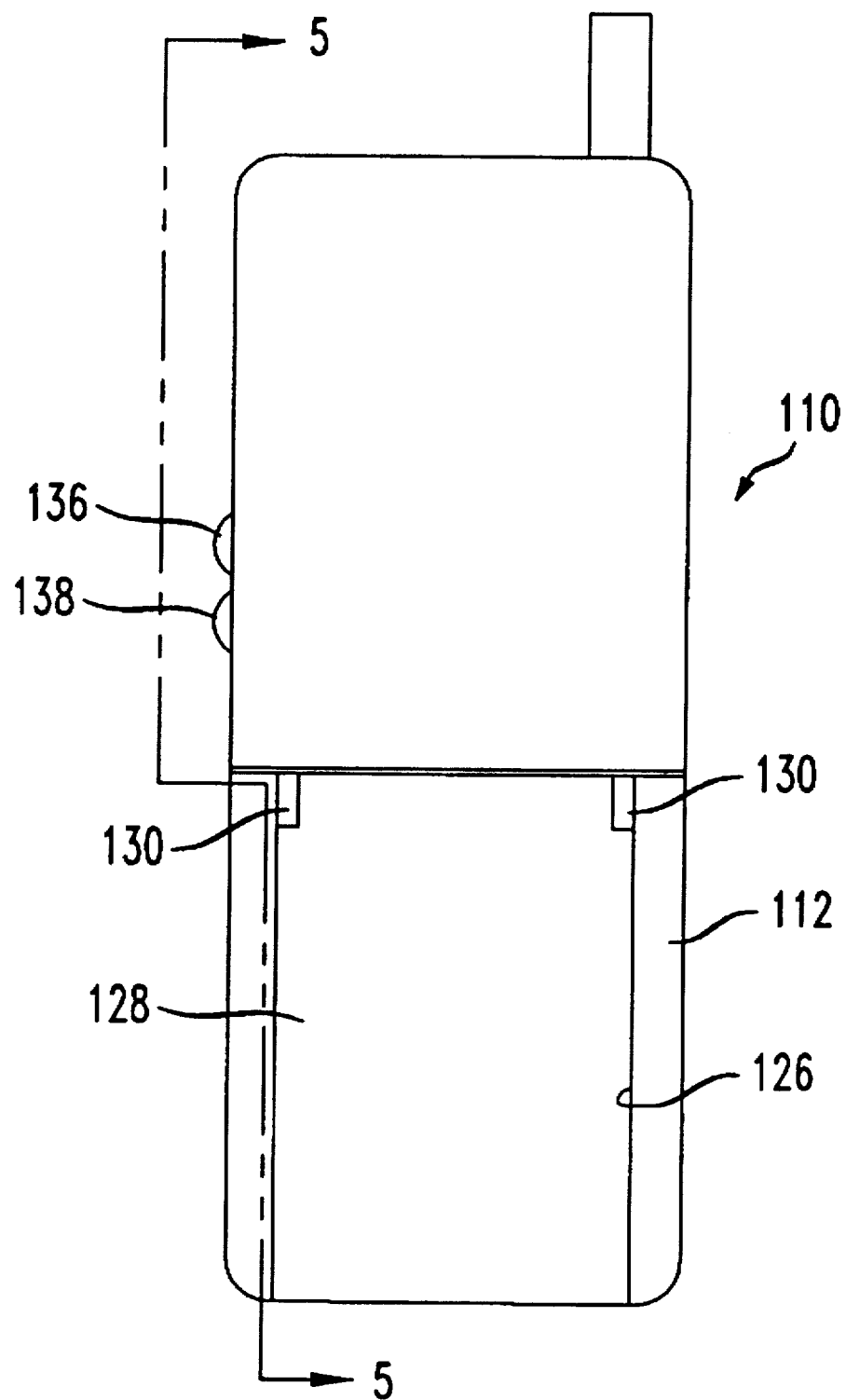
FIG. 4 is a rear elevational view of a portable telephone with a flip stand having a speaker therein according to another embodiment of the present invention.
Figure 5:
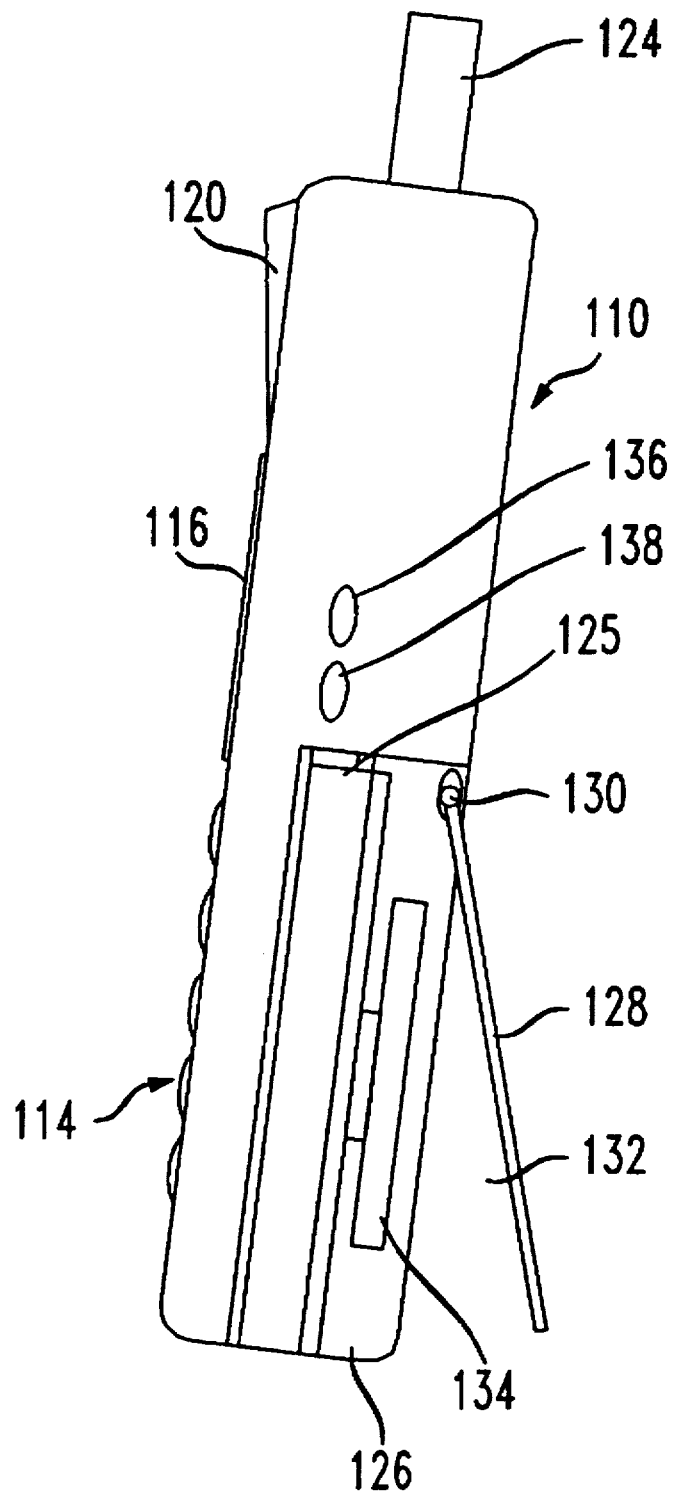
FIG. 5 is a side elevational view of the portable telephone of FIG. 4, viewed along line 5—5 thereof and shown with the flip stand pivoted outwardly away from the telephone body.
Figure 6:
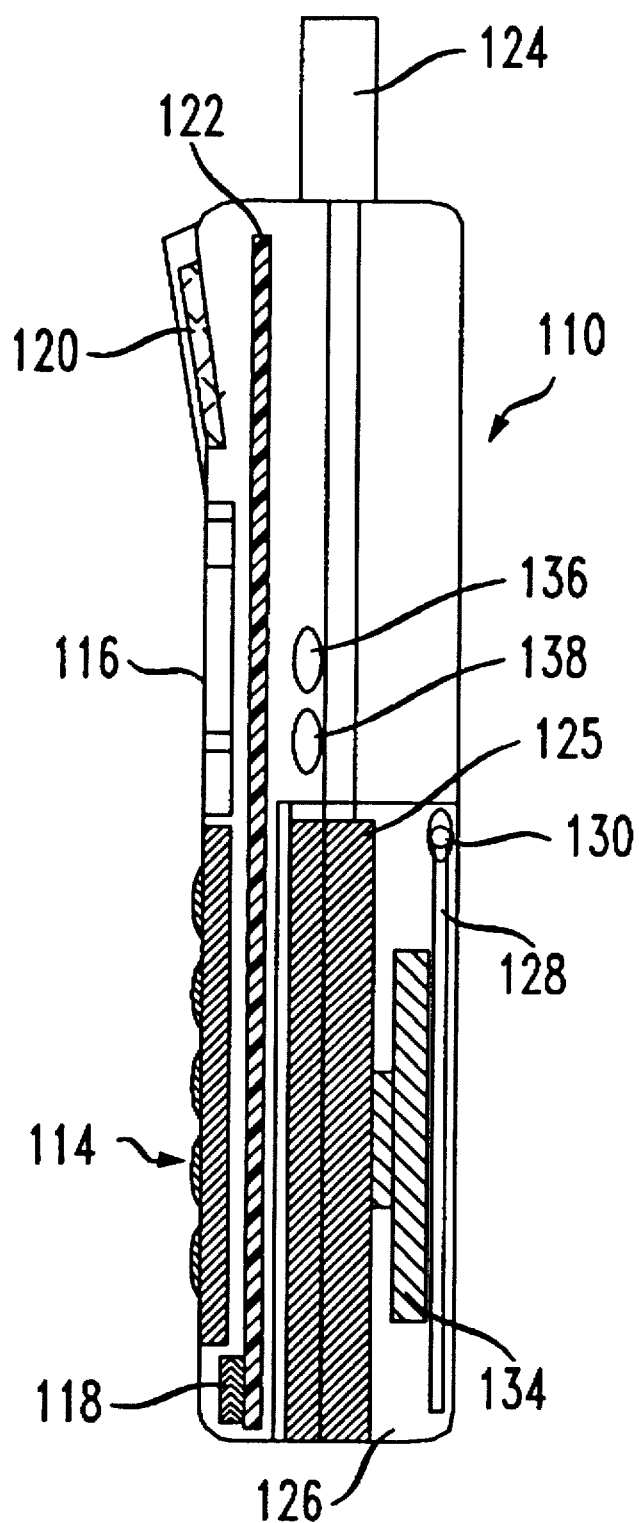
FIG. 6 is a longitudinal cross-sectional view of the portable telephone of FIG. 4, shown with the flip stand pivoted inwardly into the telephone body.
Figure 9:
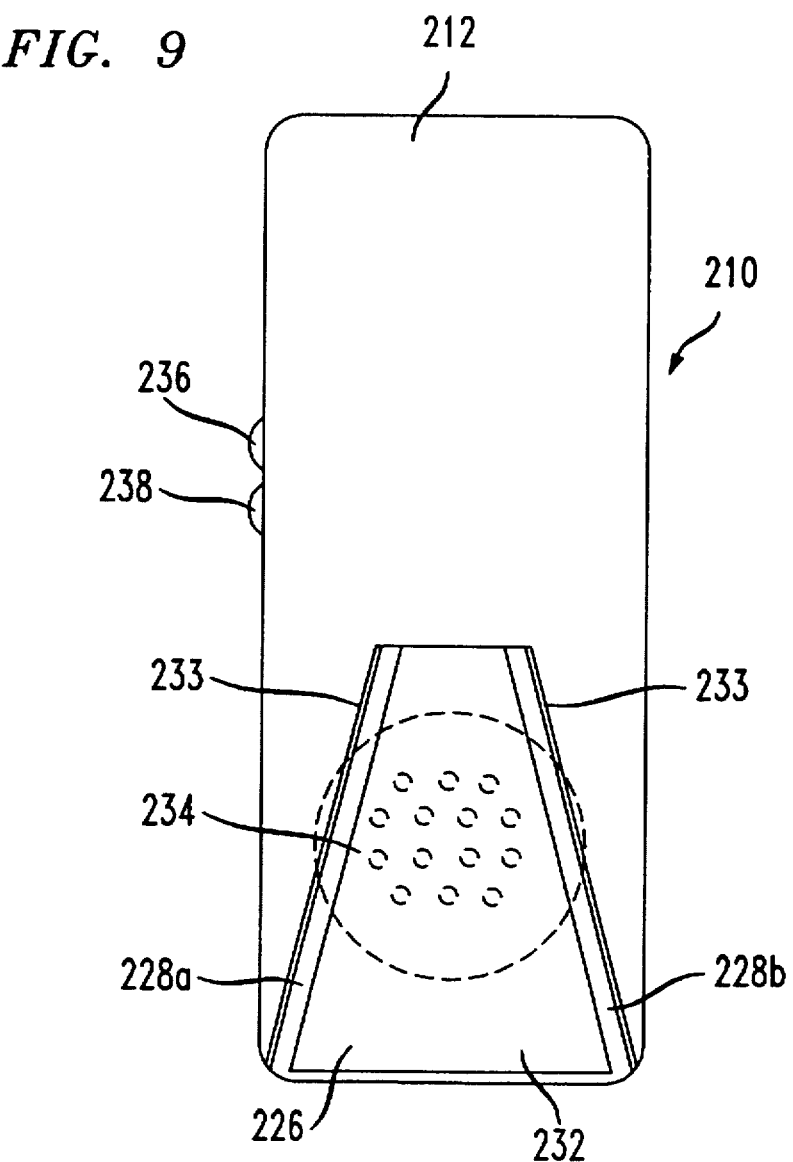
FIG. 9 is a rear plan view of the portable telephone of FIG. 8.

Referring now to FIGS. 4–6, a portable telephone 110 according to another embodiment of the present invention will now be described, in which elements common to those of portable telephone 10 of FIGS. 1–3 are referenced by the same numerals, but augmented by 100, and a detailed description of such common elements is omitted for the sake of brevity.

Specifically, portable telephone 110 is different from telephone 10 by placing loudspeaker 134 in recess 126 so as to face outwardly of the rear of telephone body 112. Thus, with flip stand 128 in the open supporting position out of recess 126, loudspeaker 134 transmits acoustic energy into acoustic baffle 132.

Further, telephone 110 differs from telephone 10 by placement of battery pack 125 within recess 126, behind loudspeaker 134.

The arrangements of keypad 114, liquid crystal display (LCD) 116, microphone 118, receiver 120, printed wiring board 122, extensible antenna 124, pivot pin 130, UP volume button 136 and DOWN volume button 138 are the same as the corresponding elements in the first embodiment of telephone 10 of FIGS. 1–3.

Thus, with both the first and second embodiments of the present invention, the loudspeaker is oriented to transmit acoustic energy into the acoustic baffle defined between the telephone body, the flip stand and the hard supporting surface, and thereby sets up an acoustic envelope that enhances the acoustics of the speakerphone.

It will be appreciated that various modifications can be made to the present invention, within the scope of the claims. For example, flip stand 28, 128 can be mounted for a different type of movement between the open and closed positions, such as a sliding arrangement or the like.

Referring now to FIGS. 7–10, a portable telephone 210 according to still another embodiment of the present invention will now be described, in which elements common to those of portable telephone 110 of FIGS. 4–6 are referenced by the same numerals, but augmented by 100, and a detailed description of such common elements is omitted for the sake of brevity.

Specifically, unlike portable telephone 110 which is mounted vertically, portable telephone 210 is mounted horizontally on a surface. Thus, rectangular recess 226 is normally covered by two doors 228a and 228b which are hinged to the rear surface of telephone body 212 by hinges 229. In the closed configuration of FIG. 7, doors 228a and 228b meet along a center line of telephone body 212 and close recess 226.

Figure 10:
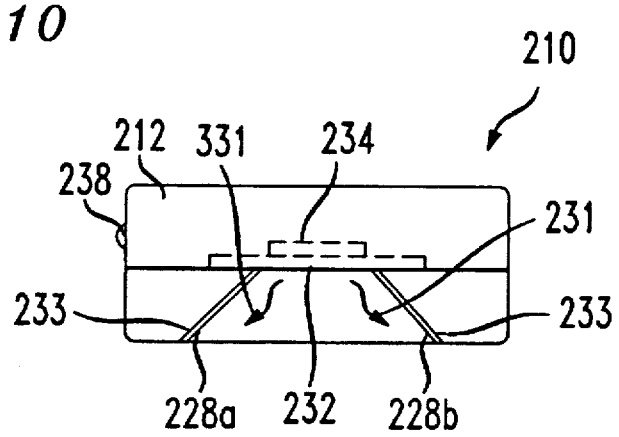
FIG. 10 is an end elevational view of the portable telephone of FIG. 8.

However, when doors 228a and 228b are hinged outwardly in the direction of arrows 231 in FIG. 10, the inner edges 233 of doors 228a and 228b extend downwardly to support telephone body 212 on a hard flat surface. Thus, an acoustic baffle 232 is defined between telephone body 212, doors 228a and 228b and the hard flat surface. Thus, with doors 228a and 228b in the open supporting configuration of FIGS. 8–10, loudspeaker 234 transmits acoustic energy into acoustic baffle 232, and thereby sets up an acoustic envelope that enhances the acoustics of the speakerphone.

The arrangements of keypad 214, liquid crystal display (LCD) 216, microphone 218, receiver 220, the printed wiring board, the extensible antenna, UP volume button 236 and DOWN volume button 238 are the same as the corresponding elements in the second embodiment of telephone 110 of FIGS. 4–6.

It will be appreciated that various modifications can be made to this embodiment within the scope of the claims. For example, doors 228a and 228b can be mounted for a different type of movement between the open and closed positions, such as a sliding arrangement or the like.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. A portable telephone comprising:
   a telephone body having a lower recess at one side thereof;
   a microphone mounted to said telephone body and into which a user speaks;
   a receiver mounted to said telephone body and by which the user can listen when the receiver is placed adjacent an ear of the user;
   a flip stand mounted to said telephone body for movement between a first position within said lower recess and a second position out of said lower recess, said flip stand serving to support said telephone body in an upright orientation on a surface in said second position;
   an acoustic baffle defined between said telephone body, said flip stand and the surface on which the telephone is supported when said flip stand is in said second position, the acoustic baffle being open at at least one end thereof; and
   a speaker oriented to transmit acoustic energy into said acoustic baffle and mounted to one of:
   said telephone body, and
   said flip stand.

2. A portable telephone according to claim 1, wherein said flip stand is pivotally mounted to said telephone body.

3. A portable telephone according to claim 1, further comprising pivot pin means for pivotally mounting an upper end of said flip stand to said telephone body.

4. A portable telephone according to claim 1, wherein said acoustic baffle has an inverted V-shaped configuration.

5. A portable telephone according to claim 1, further comprising:
   a keypad mounted to said telephone body and by which telephone numbers can be dialed; and
   a liquid crystal display (LCD) mounted to said telephone body for displaying information.

6. A portable telephone comprising:
   a telephone body having a lover recess at one side thereof;
   a microphone mounted to said telephone body and into which a user speaks;
   a receiver mounted to said telephone body and by which the user can listen when the receiver is placed adjacent an ear of the user;
   a flip stand mounted to said telephone body for movement between a first position within said lower recess and a second position out of said lower recess, said flip stand serving to support said telephone body in an upright orientation on a surface in said second position;
   an acoustic baffle defined between said telephone body, said flip stand and the surface on which the telephone is supported when said flip stand is in said second position, the acoustic baffle being open at at least one end thereof; and
   a speaker mounted to said flip stand and oriented to transmit acoustic energy into said acoustic baffle.

7. A portable telephone according to claim 6, wherein said flip stand is pivotally mounted to said telephone body.

8. A portable telephone according to claim 6, further comprising pivot pin means for pivotally mounting an upper end of said flip stand to said telephone body.

9. A portable telephone according to claim 6, wherein said acoustic baffle has an inverted V-shaped configuration.

10. A portable telephone according to claim 6, further comprising:
    a keypad mounted to said telephone body and by which telephone numbers can be dialed; and
    a liquid crystal display (LCD) mounted to said telephone body for displaying information.

11. A portable telephone comprising:
    a telephone body having a lower recess at one side thereof;
    a microphone mounted to said telephone body and into which a user speaks;
    a receiver mounted to said telephone body and by which the user can listen when the receiver is placed adjacent an ear of the user;
    a flip stand mounted to said telephone body for movement between a first position within said lower recess and a second position out of said lower recess, said flip stand serving to support said telephone body in an upright orientation on a surface in said second position;
    an acoustic baffle defined between said telephone body, said flip stand and the surface on which the telephone is supported when said flip stand is in said second position, the acoustic baffle being open at at least one end thereof; and
    a speaker mounted to said telephone body and oriented to transmit acoustic energy into said acoustic baffle.

12. A portable telephone according to claim 11, wherein said flip stand is pivotally mounted to said telephone body.

13. A portable telephone according to claim 11, further comprising pivot pin means for pivotally mounting an upper end of said flip stand to said telephone body.

14. A portable telephone according to claim 11, wherein said acoustic baffle has an inverted V-shaped configuration.

15. A portable telephone according to claim 11, further comprising:
    a keypad mounted to said telephone body and by which telephone numbers can be dialed; and
    a liquid crystal display (LCD) mounted to said telephone body for displaying information.

16. A portable telephone comprising:
    a telephone body having a lower recess at one side thereof;
    two doors mounted to said telephone body for movement between a first position in covering relation to said lower recess and a second position exposing said lower recess, said doors serving to support said telephone body in a horizontal orientation on a surface in said second position;
    an acoustic baffle defined between said telephone body, said doors and the surface on which the telephone is supported when said doors are in said second position, the acoustic baffle being open at at least one end thereof; and
    a speaker oriented to transmit acoustic energy into said acoustic baffle and mounted to said telephone body.

17. A portable telephone according to claim 16, wherein said doors are hingedly mounted to said telephone body.

18. A portable telephone according to claim 16, further comprising:
    a keypad mounted to said telephone body and by which telephone numbers can be dialed;
    a liquid crystal display (LCD) mounted to said telephone body for displaying information;
    a microphone mounted to said telephone body and into which a user speaks; and
    a receiver mounted to said telephone body and by which the user can listen when the receiver is placed adjacent an ear of the user.

* * * * *